(12) United States Patent
Verma et al.

(10) Patent No.: US 10,033,765 B2
(45) Date of Patent: Jul. 24, 2018

(54) DISTRIBUTED STORAGE PROCESSING STATEMENT INTERCEPTION AND MODIFICATION

(71) Applicant: BlueTalon, Inc., Redwood City, CA (US)

(72) Inventors: Pratik Verma, Hopkins, MN (US); Rakesh Khanduja, Hopkins, MN (US)

(73) Assignee: BlueTalon, Inc., Redwood City, CA (US)

(*) Notice: Subject to any disclaimer, the term of this patent is extended or adjusted under 35 U.S.C. 154(b) by 227 days.

(21) Appl. No.: 14/967,095

(22) Filed: Dec. 11, 2015

(65) Prior Publication Data
US 2016/0205140 A1 Jul. 14, 2016

Related U.S. Application Data

(60) Provisional application No. 62/101,341, filed on Jan. 8, 2015.

(51) Int. Cl.
*H04L 29/06* (2006.01)
*G06F 17/30* (2006.01)

(52) U.S. Cl.
CPC ........ *H04L 63/20* (2013.01); *G06F 17/30463* (2013.01); *H04L 63/083* (2013.01); *H04L 63/10* (2013.01)

(58) Field of Classification Search
CPC ....... H04L 63/20; H04L 63/083; H04L 29/06; G06F 17/30463; G06F 17/30
USPC .............................. 726/1, 4, 5, 17; 713/161
See application file for complete search history.

(56) References Cited

U.S. PATENT DOCUMENTS

| 5,664,173 A * | 9/1997 | Fast .......................... G06F 8/42 704/1 |
| 6,427,020 B1 * | 7/2002 | Rhoads ................. G06T 1/0021 283/901 |
| 6,539,425 B1 | 3/2003 | Stevens et al. |
| 6,694,306 B1 | 2/2004 | Nishizawa et al. |

(Continued)

OTHER PUBLICATIONS

International Search Report and Written Opinion issued to international patent application No. PCT/US2016/012433, dated Mar. 11, 2016, 7 pgs.

(Continued)

*Primary Examiner* — Ashok Patel
*Assistant Examiner* — Quazi Farooqui (57) ABSTRACT

A non-transitory computer readable storage medium has instructions executed by a processor to intercept a query statement at a master machine. The query statement is an instruction from a client machine that specifies how data managed by a distributed storage system should be processed and provided back to the client. In the communication between the client and the master machine, tokens associated with the statement are evaluated to selectively identify a pattern match of one of connection pattern tokens, login pattern tokens or query pattern tokens. For the query pattern tokens, altered tokens for the query statement are formed in response to the pattern match to establish a revised statement. The revised statement is produced in response to application of a policy rule. The revised statement maintains computation, logic and procedure of the statement, but alters parameters of the statement as specified by the policy rule.

9 Claims, 6 Drawing Sheets

(56) References Cited

U.S. PATENT DOCUMENTS

| | | |
|---|---|---|
| 6,820,082 B1 | 11/2004 | Cook et al. |
| 7,577,834 B1 | 8/2009 | Traversat et al. |
| 9,804,866 B2 | 10/2017 | Halls et al. |
| 2002/0031230 A1 | 3/2002 | Sweet et al. |
| 2002/0055921 A1 | 5/2002 | Yoshimura et al. |
| 2005/0289342 A1 | 12/2005 | Needham et al. |
| 2007/0168364 A1* | 7/2007 | Douceur ............. G06F 17/3012 |
| 2008/0046462 A1 | 2/2008 | Kaufman et al. |
| 2008/0263358 A1 | 10/2008 | Alme |
| 2009/0193493 A1 | 7/2009 | Becker et al. |
| 2010/0325097 A1 | 12/2010 | Er et al. |
| 2011/0141124 A1 | 6/2011 | Halls et al. |
| 2012/0054217 A1 | 3/2012 | Clarke |
| 2012/0117644 A1 | 5/2012 | Soeder |
| 2013/0091173 A1 | 4/2013 | Pooley et al. |
| 2013/0091355 A1* | 4/2013 | Lear ........................ H04L 63/02 713/168 |
| 2013/0246796 A1* | 9/2013 | Lichtenstadt ....... G06F 21/6227 713/176 |
| 2014/0047227 A1* | 2/2014 | Breternitz ............. G06F 9/5066 713/2 |
| 2014/0052749 A1 | 2/2014 | Rissanen et al. |
| 2014/0101713 A1 | 4/2014 | Entin et al. |
| 2014/0163948 A1 | 6/2014 | Daly et al. |
| 2014/0317226 A1 | 10/2014 | Resch et al. |
| 2015/0058480 A1* | 2/2015 | Allgaier ................ H04L 61/106 709/224 |

OTHER PUBLICATIONS

International Search Report and Written Opinion issued to international patent application No. PCT/US2016/012435, dated Mar. 11, 2016, 7 pgs.

International Search Report and Written Opinion issued to international patent application No. PCT/US2016/012429, dated Mar. 31, 2016, 7 pgs.

* cited by examiner

```
500
01 00 00 00 05 50 4c 41 49 4e 08 00 00 00 16 00    .....PLAIN......
62 6f 62 40 61 67 65 74 61 6b 00 61 67 65 74 61    bob@agetak.ageta
6b 23 31 32 33                                     k#123
```

FIG. 5    502

```
600
01 00 00 00 05 50 4c 41 49 4e 08 00 00 00 16 00    .....PLAIN......
61 61 61 61 61 61 61 61 61 61 00 61 61 61 61 61    aaaaaaaaaa.aaaaa
61 61 61 61 61                                     aaaaa
```

FIG. 6    602

```
700
00 00 00 84 00 01 00 01 00 00 00 10 45 78 65 63    ............Exec
75 74 65 53 74 61 74 65 6d 65 6e 74 00 00 00 00    uteStatement....
6c 00 01 6c 00 01 6c 00 01 6b 00 01 00 00 00 10    ...l...l...k....
b2 af 19 a2 f2 2a 4a 9f 5c 1b 51 75 a0 91 36 bd    .....*J.\.Qu..6.
6b 00 02 00 00 00 10 a4 cd e5 d6 48 f2 4e 85 ab    ...........H.N..
34 f1 bb e5 23 81 f4 00 00 0b 00 02 00 00 00 19    4...#...........
73 65 6c 65 63 74 20 2a 20 66 72 6f 6d 20 70 75    select * from pu
72 63 68 61 73 65 6e 65 77 00 00 00 0b 0b 00 00    rchasenew.......
00 00 02 00 04 01 00 00                            ........
```

FIG. 7    702

```
800
00 00 00 84 00 01 00 01 00 00 00 10 45 78 65 63    ............Exec
75 74 65 53 74 61 74 65 6d 65 6e 74 00 00 00 00    uteStatement....
6c 00 01 6c 00 01 6c 00 01 6b 00 01 00 00 00 10    ...l...l...k....
b2 af 19 a2 f2 2a 4a 9f 5c 1b 51 75 a0 91 36 bd    .....*J.\.Qu..6.
6b 00 02 00 00 00 10 a4 cd e5 d6 48 f2 4e 85 ab    ...........H.N..
34 f1 bb e5 23 81 f4 00 00 0b 00 02 00 00 00 19    4...#...........
73 65 6c 65 63 74 20 2a 20 66 72 6f 6d 20 78 78    select * from xx
72 63 68 61 73 65 6e 65 77 00 00 00 0b 0b 00 00    xxxxxxxx........
00 00 02 00 04 01 00 00                            ........
```

FIG. 8    802

DISTRIBUTED STORAGE PROCESSING STATEMENT INTERCEPTION AND MODIFICATION

CROSS-REFERENCE TO RELATED APPLICATION

This application claims priority to U.S. Provisional Patent Application Ser. No. 62/101,341, filed Jan. 8, 2015, the contents of which are incorporated herein by reference.

FIELD OF THE INVENTION

This invention relates generally to data processing in a network. More particularly, this invention relates to distributed storage and distributed processing statement interception and modification.

BACKGROUND OF THE INVENTION

Query statements can be formed to obtain data from distributed storage and distributed processing resources. The distributed storage may be a distributed database or a distributed file system. Apache Hadoop® is an open-source software framework for distributed storage and distributed processing of very large data sets on computer clusters built from commodity hardware.

In order to implement distributed computing, there are typically three main functional components: the client component, the management component and the worker component. The client component accepts input from the end user and converts it into requests that are sent to the management component. The management component splits a request into multiple sub-requests and sends the sub-requests to the worker components for processing in parallel. The worker components each process the request by operating on data. Typically, the management component serves as the first point of response serving many requests by many clients simultaneously and coordinating multiple worker components for any given request. In some cases, there may be another machine delegated to receive requests from the client application on behalf of the management component.

This three-component paradigm is applicable across all major components of Hadoop including the storage layer (e.g., Hadoop Distributed Files System (HDFS)), the compute layer (i.e., MapReduce®) and the access layer (e.g., Hive®, Solr®, Spark®, Storm®, etc.), where there is a server component that responds to the requests from various clients.

One challenge working with an open source platform, such as Hadoop, is that the code base continuously changes due to contributions from the contributor community. Consequently, it is difficult to augment system functionality in a manner that is guaranteed to work with the continuously changing code base. Accordingly, it would be desirable to develop techniques for producing statement modifications that are certain to be operative with a continuously changing code base.

SUMMARY OF THE INVENTION

A non-transitory computer readable storage medium has instructions executed by a processor to intercept a query statement at a master machine, or a machine delegated by the master machine to receive requests from clients. The query statement is an instruction from a client machine that specifies how data managed by a distributed storage system should be processed and provided back to the client. In the communication between the client and the master machine, tokens associated with the statement are evaluated to selectively identify a pattern match of one of connection pattern token, login pattern tokens or query pattern tokens. For the query pattern tokens, altered tokens for the query statement are formed in response to the pattern match to establish a revised statement. The revised statement is produced in response to application of a policy rule. The revised statement maintains computation, logic and procedure of the statement, but alters parameters of the statement as specified by the policy rule.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
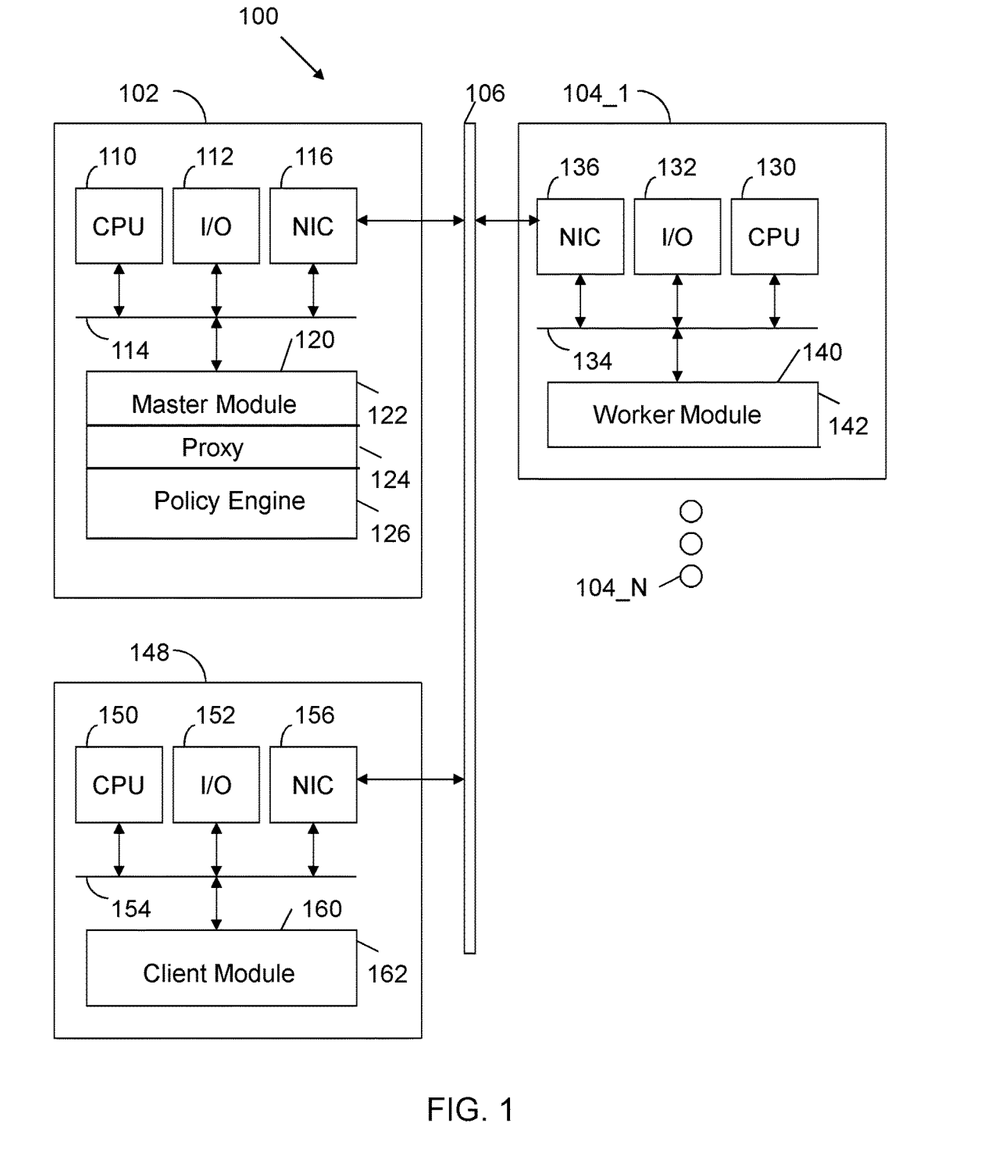
FIG. 1 illustrates a system configured in accordance with an embodiment of the invention.

FIG. 1 illustrates a network 100 configured in accordance with an embodiment of the invention. The network 100 includes a server 102 connected to a set of servers 104_1 through 104_N via a network 106. The server 102 can be a master server, while servers 104_1 through 104_N are worker servers in a distributed storage and a distributed processing environment. Network 106 may be any combination of wired and wireless networks.

Server 102 includes standard components, such as a central processing unit 110 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory stores instructions executed by the central processing unit 110 to implement operations of the invention. In particular, the memory 120 stores a master module 122 to implement standard master node operations within a distributed storage and distributed processing environment. The memory also stores a proxy 124 and a policy engine 126 which include instructions executed by the processor 110 to implement operations of the invention. It is also possible for the proxy 124 and policy engine 126 to reside on a separate machine that can communicate with other machines on the network 106. The proxy 124 effectively sits in front of the master module 122 and continuously listens for request from clients on an IP/Port and forwards requests from the clients to the appropriate IP/Port to the appropriate management component. The proxy 124 forwards all communications in the native request-response protocol without modification, except in certain cases, such as connection requests, authentication requests and requests for data. The proxy 124 is able to distinguish between which packets to forward without modification and which to hold until they can be modified. In such a case, the proxy 124 traps the request and sends the request and the detected meta-data to the policy engine 126 to get a modified policy compliant request back from the policy engine 126. The kinds of information that the proxy 124 detects may include the query string, the login name, client parameters such as the IP address of the client, etc. The policy engine 126 may use any of these detected parameters to provide instructions to the proxy 124 on how to modify the bytes of the packets. The proxy 124 then inserts the modified request into part of the session that is interrupted within the native request response protocol format and continues the session forward. The management component processes the modified request received from the proxy 124 as if it were obtained from the client.

The proxy 124 intercepts the application level details for the Hadoop request-response protocol so that additional logic can be inserted into the communication between client and server components without modifying the code on either side. Most of the protocol is unchanged, only specific data packets are captured and only specific method calls are changed. The proxy 124 reconstructs packets to inject desired functionality.

Each worker server 104_1 through 104_N also includes standard components, such as a central processing unit 130, bus 134, input/output devices 132 and a network interface circuit 136. A memory 140 is connected to bus 132. The memory 140 stores a worker module 142 to implement distributed storage and distributed processing operations. Each worker server may incorporate a proxy 124, a policy engine 126, or both if additional per worker modification of the query is desired.

The network 100 may also include a client machine 148. The client machine 148 includes standard components, such as a central processing unit 150, input/output devices 152, a bus 154 and a network interface circuit 156. A memory 160 is connected to bus 154. The memory 160 stores a client module 162 with instructions executed by the central processing unit 150. The client module 162 may facilitate the formation of a query, which is then directed toward the master module 122 of master server 102. The client module 162 includes drivers to send communications to the master module 122, where it is intercepted by proxy 124 before the communication is received by the master module 122, as discussed below. In many cases, the client module 162 and master module 122 are not aware that the proxy 124 is intercepting the communication because neither the client module 162 nor the master module 122 need to change their standard protocol for communication.

Figure 2:
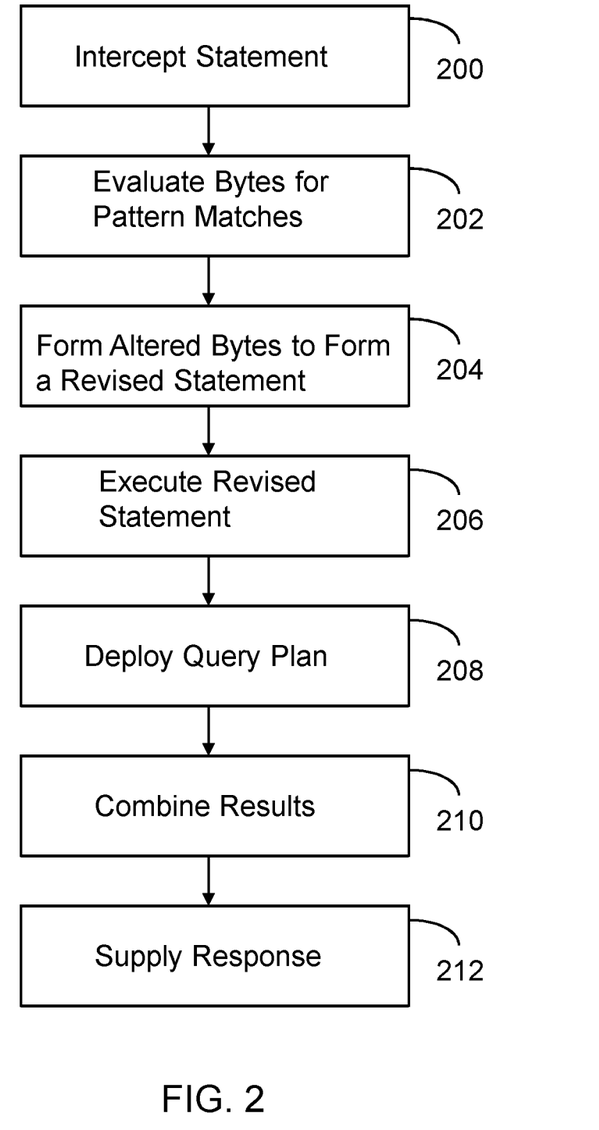
FIG. 2 illustrates processing operations associated with a proxy and policy engine utilized in accordance with an embodiment of the invention.

FIG. 2 illustrates processing operations associated with the proxy 124 and policy engine 126. A statement is intercepted 200. As previously indicated, the proxy 124 effectively sits in front of the master module 122 to intercepts statements. Tokens (e.g., bytes or combinations of bytes) are evaluated for pattern matches 202. Tokens are matched for connection patterns, login patterns and query patterns. The policy engine then forms altered tokens to form a revised statement 204. The altered tokens are altered in order to enforce a specified policy, such as a connection policy, a login policy and/or a data access policy. The packets containing the revised statement are received by the master module 122.

The revised statement is then executed 206. For example, the master module 122 develops a query plan. The query plan is then deployed 208 to worker nodes. Results are combined 210. That is, the master module 122 combines results received from the worker nodes. The combined results form a response. The response is then supplied 212 to the client.

Figure 3:
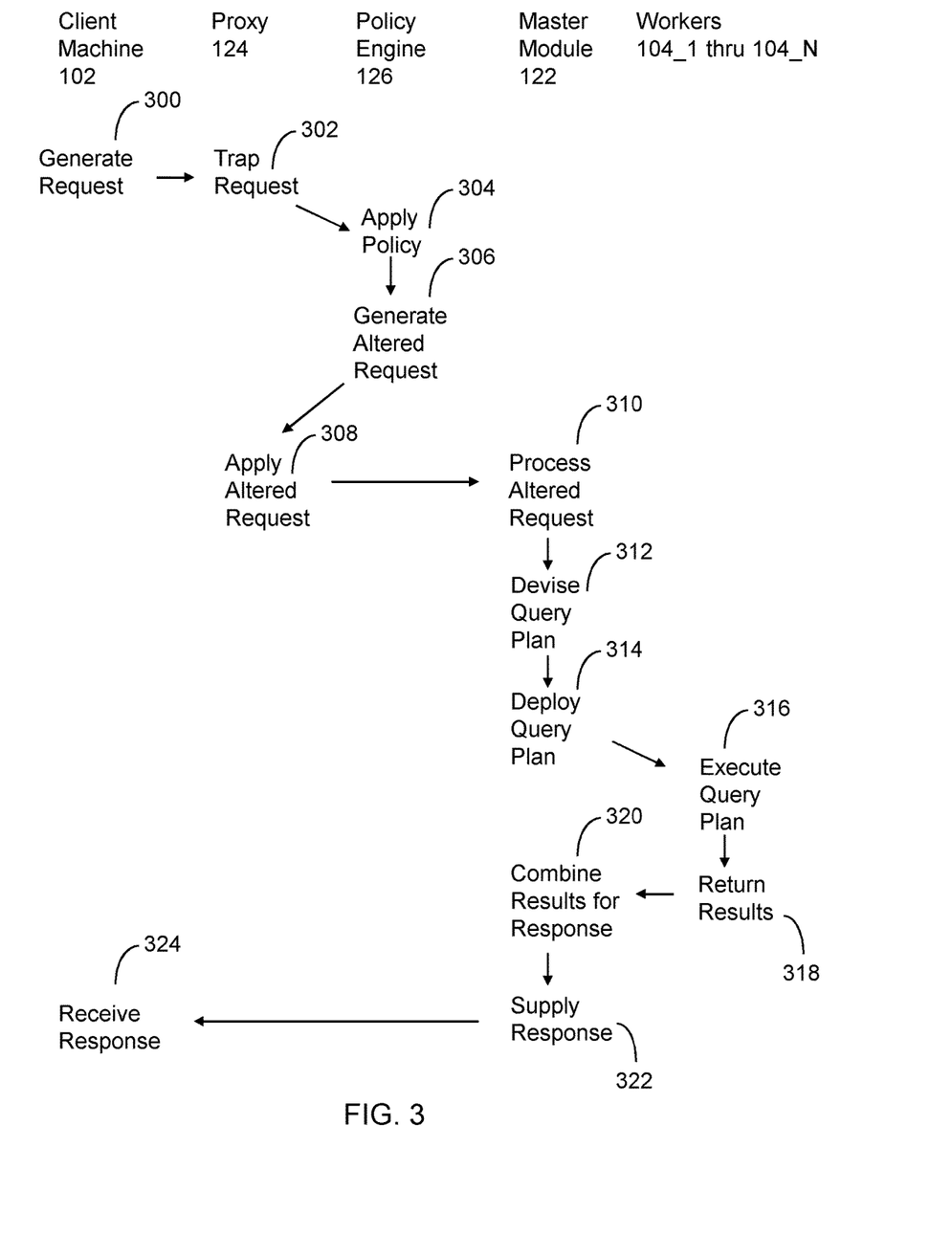
FIG. 3 illustrates processing operations associated with different components of the system.

FIG. 3 more fully characterizes this processing. A client machine 102 generates a request 300. The proxy 124 traps the request 302. That is, the proxy 124 traps the requests if there is a token pattern match. If so, the request is sent to the policy engine 126, which applies one or more policies 304 to the request to generate an altered request 306. The altered request is passed to the proxy 124, which sends the altered request 308 to the master module 122. The master module processes the altered request 310. In the case of a data request, the master module devises a query plan 312. The query plan is then deployed 314 to workers 104_1 through 104_N. The workers execute the query plan 316 and return results 318. The master module 122 combines the results to form a response 320. The response is then supplied 322 to the client machine 102. The client machine 102 receives the response 324.

Figure 4A:
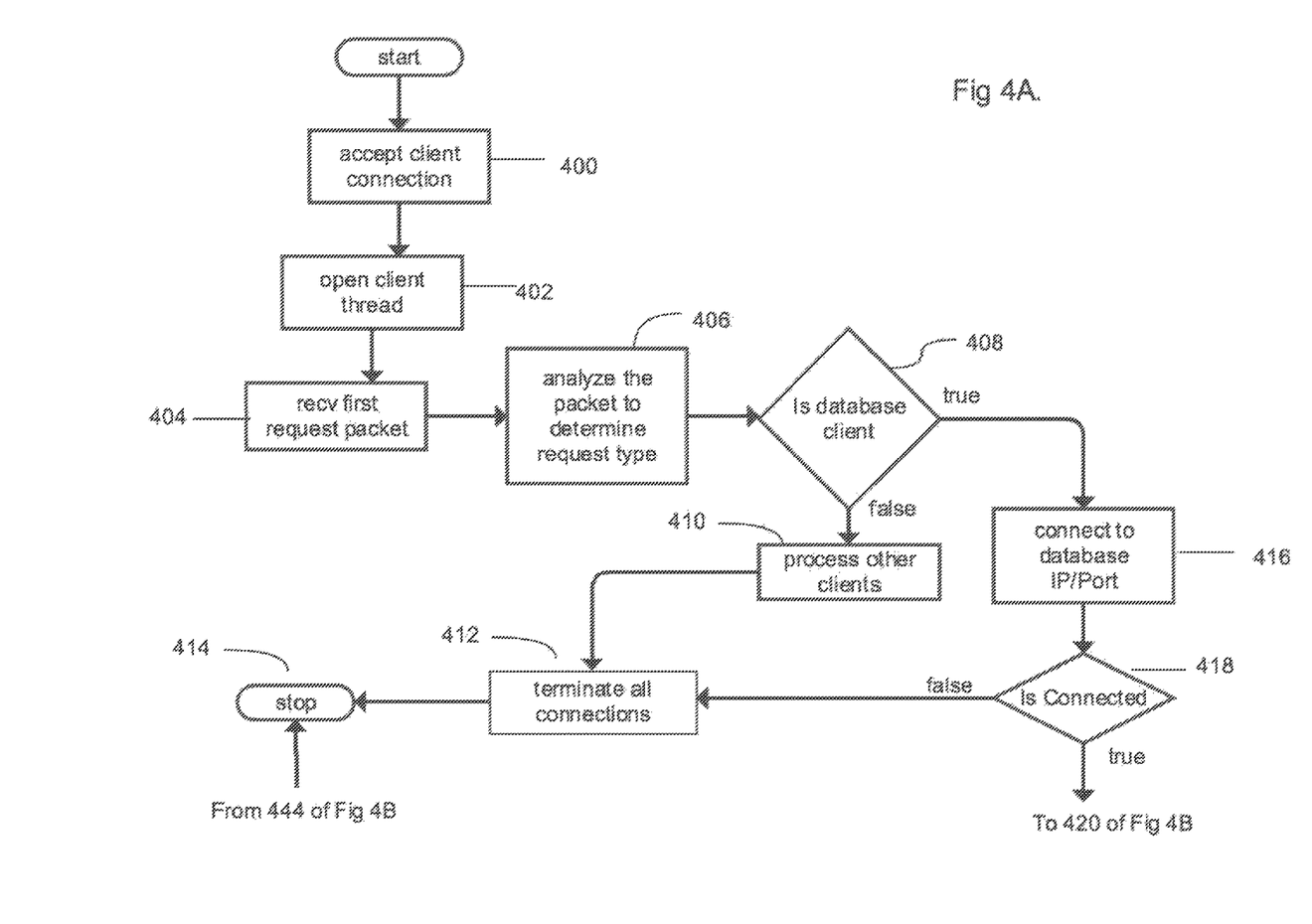
FIGS. 4A-4B illustrate packet processing performed in accordance with an embodiment of the invention.
Figure 4B:
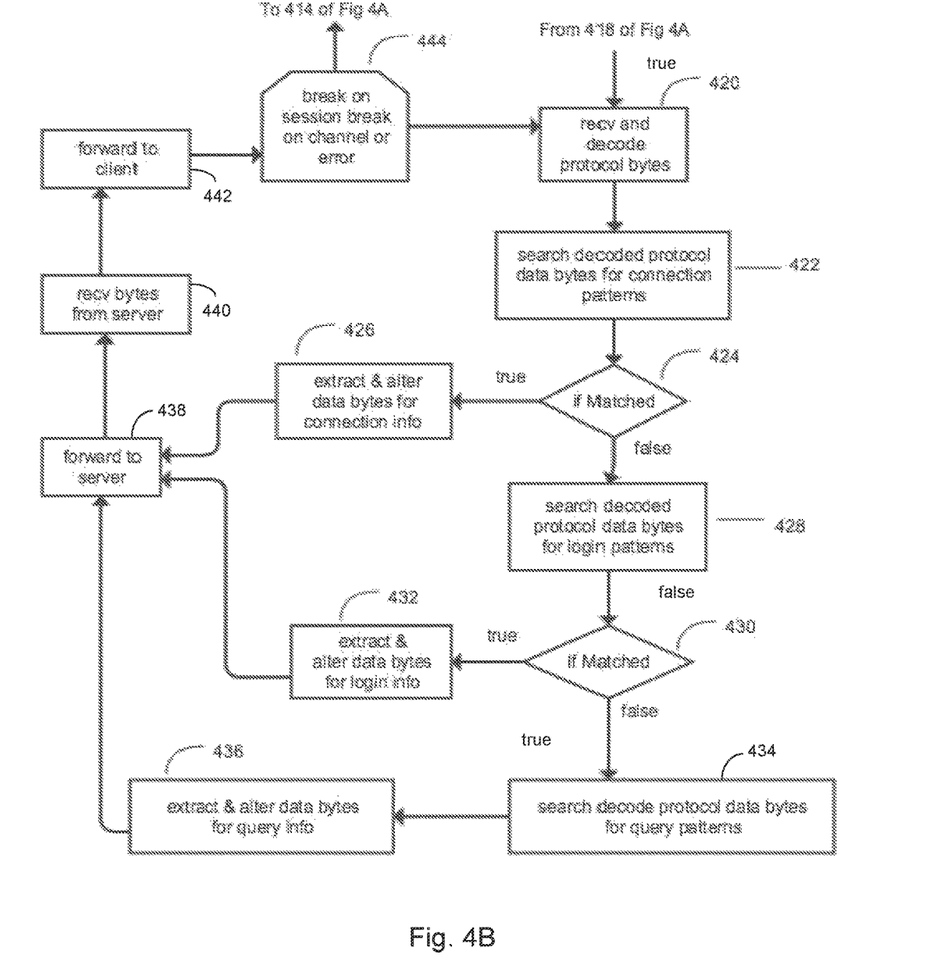

FIGS. 4A and 4B illustrate packet processing operations performed in accordance with an embodiment of the invention. A client connection is accepted 400 by the proxy 124. A client thread is opened 402 on the proxy 124. A packet is received 404. The packet is analyzed by the proxy 124 to determine a request type 406. Block 408 tests whether the request is a database client. If the request is not a database client (408—false), other clients are processed 410 until a termination state 412, upon which processing is stopped 414.

Returning to block 408, if a database client is implicated (408—true) a connection is made to the master module 122 (or a machine delegated by the master machine to receive connections from the client on behalf of the master machine) on a database IP/port 416. If a connection does not exist (418—false), processing proceeds to block 412. If a connection exists (418—true), processing proceeds to block 420 of FIG. 4B where tokens are decoded. The decoded tokens are searched for connection patterns 422. If a match exists (424—true), data byte connection information is altered 426 to enforce a policy. The modified bytes are forwarded to a server component 438 (e.g., master module 122) for processing. The processed bytes (e.g., a response) is received from the server 440 and is forwarded to client 442 (e.g., the proxy 124 forwards the response to client module 162). This processing is repeated until a session break or channel error 444. In the event of a session break or channel error 444, processing is stopped, as shown at block 414 of FIG. 4A. If there is no session break or channel error, processing returns to block 420. In some cases, another client of the proxy 124 can send a special command to break the session as in block 444.

If a match is not found in block 424 (424—false), the bytes are searched for login patterns 428. If a match is found (430—true) bytes are altered to enforce a login policy 432 and the result is forwarded to a server component 438. If a login pattern is not matched (430—false), the bytes are searched for a query pattern 434. If a query pattern if found the query bytes are modified to enforce a policy 436. The modified bytes are then forwarded to a server component 438.

Figure 5:
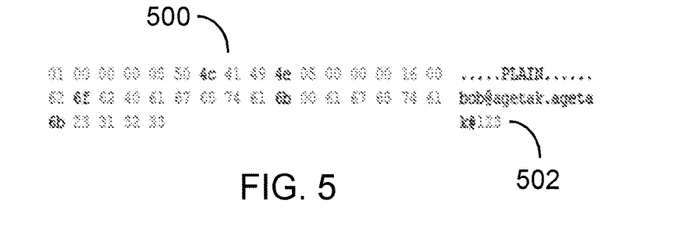
FIGS. 5-8 illustrate byte processing performed in accordance with an embodiment of the invention.
Figure 6:
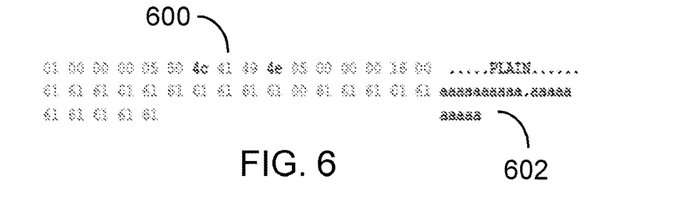

FIG. 5 illustrates bytes 500 and decoded components including a login pattern 502. In this example, the login credential (bob@agetak.agetak#123) is inadequate. Consequently, the bytes 600 are altered to preclude login. In this example, the plain text of the altered bytes is a character sequence 602 (aaaaaaaaa.aaaaaaa) that will preclude login at the server.

Figure 7:
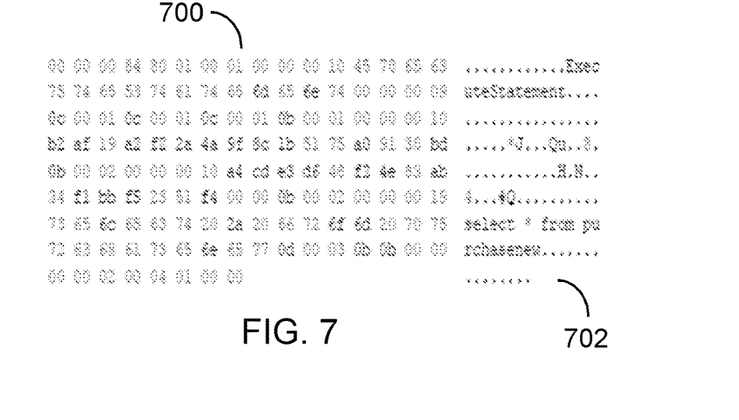
Figure 8:
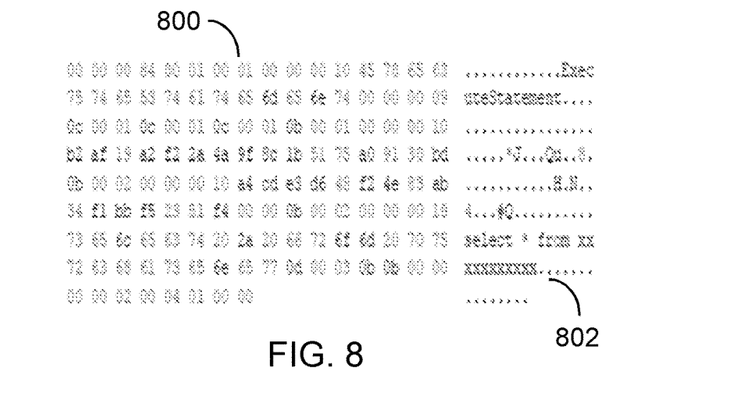

FIG. 7 illustrates bytes 700 and equivalent plain text 702. The plain text includes a data access request (ExecuteStatement . . . from purchasenew). Query bytes 800 are altered to enforce a policy. In this case, access to the "purchasenew" source data is blocked by obscuring the source using xxxxxxxx characters 802. In addition to the modified string as shown in FIG. 8, the query string can also contain sub-strings formatted as comments that are ignored by the master module, but that contain additional text that can be used to watermark the session.

Below is a table illustrating various Hadoop services, the server that handles the Hadoop service, the types of requests that are handled and the meta-data that is detected in accordance with embodiments of the invention.

| Hadoop ® Service | Server | Request | Detected Meta-data |
|---|---|---|---|
| Storage HDFS | Name Node | HDFS commands on a URI that return the file contents or operate on one or more files specified by the URI | Fields contained within the file URI Requesting user identity |
| Computation MapReduce ® YARN ® | Resource Manager | MapReduce job with a Java ® program that operates on one or more files specified by a URI | Fields contained within the file URI Fields serialized in the Java program Methods names and arguments in the Java program Requesting user identity |
| Access Hive ® Impala ® Solr ® | HiveServer2, Impala Daemon, Solr | A query (an hql query or a search query for example) that operates on a pre-defined table or index. | Fields contained in the request Requesting user identity |

In case of HDFS, the management component is the Name Node, the worker component is the Data Node, and the client components can be different software including hdfs dfs jar, webhdfs, httpfs, or a custom client created by a software vendor that initiates a request using the HDFS compatible protocol.

To protect data in the files from being used directly through HDFS clients, the proxy 124 proxies the Name Node. The Name Node is sent meta-data operations requests by any and all clients that issue HDFS commands. When the proxy 124 detects a URI and an HDFS command, it sends the request meta-data including the user identity making the request from the client to the policy engine 126 to obtain a modified URI. The modified URI is based on the entitlement of the requesting user to the file or fields and records contained within the file of the URI. The modified URI may be empty, may contain a series of URIs with fewer files or alternate files with truncated data. The request with the original command and the modified URI are sent to the Name Node for processing. This approach is used for all requests for files that originate from direct clients to HDFS.

In case of MapReduce, the management component is the Resource Manager. The worker component comprises the Node Manager in MR1 or a Node Manager and Application Master in the case of MR2, which is commonly referred to as YARN. The client can be the MapReduce client provided as part of the Hadoop common library or a language specific implementation, such as Ruby CLI® created by Amazon Web Services (AWS). The Resource Manager in a Hadoop cluster is responsible for tracking the resources in a cluster and scheduling MapReduce jobs. The Resource Manager is sent MapReduce job requests by any and all clients that submit jobs.

To enforce access control on MapReduce jobs so the job can only operate on the data that the requester of the job is entitled to use, proxy 124 proxies the Resource Manager. For each job submitted to the Resource Manager before it is processed, the proxy traps the request and sends the job meta-data including the user identity making the request from the client to the policy engine 126 to obtain a modified request. Based on the entitlement of the requesting user to the fields present in the URI specified in the job and to the fields deserialized in the Java program provided with the MapReduce job, the modified URI may be blank, may contain a series of URIs with fewer files or alternate files with truncated data. In this case, only the jobs for users with fields allowed in the jobs that operate on the files containing fields allowed to the user are allowed to continue; the rest are terminated. This approach is used to secure all MapReduce jobs.

In case of the access layer, an important access method includes interactive query methods implemented as Apache Hive, Cloudera Impala®, Hortonworks Stinger®, and other HQL-on-Hadoop mechanisms. In each of these cases, HiveServer2 can be used as a management component that receives requests in Hive Query Language (HQL), converts them into MapReduce jobs for execution and returns the result to the client components. In the case of an MPP method that can use HQL as the query language (for example Impala), the Query Execution Engine is proxied directly (imapald in case of Impala) rather than just going through the HiveServer.

To enforce access control on HiveQL requests so that the requesting users get only the data they are entitled to in a format that is compatible with the original request that the client expects, proxy 124 may proxy the HiveServer2. For each HQL request sent to the HiveServer by the client, the proxy 124 traps the request and sends the original query statement and requesting user id to the policy engine 126. Based on the entitlement of the requesting user to the fields present in the query, the modified query may contain original fields, dummy values, transformed values, partially transformed values, predicates that filter out records that meet certain criteria, or some combination of these. By doing so the HQL statement contains the same computation, logic and procedure, but only the data elements in a set that the requesting user has access to.

In one embodiment of the invention, the client module 162 may include drivers that intercept a request and redirect it to the proxy 124. The drivers override the base driver Java classes of the target database and override the function calls to execute the specified functions before creating a connection to the target database and submitting the call.

A driver class may be derived from the java.HQL.Driver and hence implement all the functioning of a JDBC Driver. The class may be used to connect to the policy engine 126. It also reads the values of IP and Ports of various servers through the configuration file. It connects to the remote database by means of the IP address and port provided by the user at the time of passing a URL.

In one embodiment, the proxy 124 is used to get the statement and PreparedStatement objects. It implements the java.HQL.Connection Interface and redefines some of the methods to get these variables by using the SConnection object. It also defines some of the methods to set the IP and Ports for the Policy Engines.

The proxy 124 may include a Statement proxy (S Statement) that implements the java.HQL.Statement interface and defines all of its methods to execute an HQL query. It also defines some methods to set the policy engine 126 IP and port and some parameters related to databases.

The proxy 124 may include a PreparedStatement proxy (SPreparedStatement) that implements the java.HQL.PreparedStatement interface and defines all of its methods to execute an HQL query. It also defines some methods to set the policy engine 126 IP and port and some parameters related to databases.

The end user using the client module JDBC Drivers is first authenticated at the policy engine 126. The User passes the username along with the URL to a driver. Then a query is passed to the policy engine 126 that executes the "login" command there, and returns the information that the user is valid or not. After proper authentication the user can execute various queries.

The query that a user enters is passed to the SStatement and SPreparedStatement for execution. The methods executeQuery and executeUpdate are used for this purpose. These methods internally modify the HQL query to be executed by using the getModifiedHQL method, which uses the getModifiedHQL method of a NativeCommand class. This method passes the query to the policy engine 126, which returns the modified query and then the query is passed to the database for execution.

The following table provides exemplary services, service functions, software modules and the functions performed by the software modules.

| Service | Service Function | Module | Module Function |
| --- | --- | --- | --- |
| dshive | Enforcement point for applications that can use any Hive client and HQL to query data in Hadoop. | Intercept | Proxy Hive server at TCP level to intercept the userid, HQL requests and session attributes to send to policy engine and repackage the policy compliant query in the session for execution against the back-end database. Used to Intercept connection to detect end-user id and HQL request Put modified HQL in session to return a valid response to client Listen for connection at a valid TCP port and forward the packet to correct source Output audit logs keyed with a session id and with timing for login, policy decision and back-end query response |
| policyengine | Policy engine that allows granular policies to be enforced by accepting a user identity and a request in a query language (HQL, HQL, SparQL, etc) and returning a policy compliant request that can be executed against the physical data source to get a policy compliant result. | End-user authentication | Bridge the interaction between the intercept and a source of user-id/password authentication. Possible sources are external LDAP, external Active Directory, external databases and internal user store. Used for the following capabilities: User identity to group membership in LDAP or Active Directory. LDAP over SSL between module and external LDAP. Policy based connection authorization. |
| | | Policy query re-engineering | Reengineer a query on a physical model to make it policy compliant. It tokenizes a query, runs tokens against ACL to make policy decisions and constructs a valid HQL query that is policy compliant. |

-continued

| Service | Service Function | Module | Module Function |
|---|---|---|---|
| | | Attribute resolution | For a given user thread, looks up the value of attributes that need to be computed against an external LDAP or HQL source. |

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with Instructions executed by a processor to:
   intercept a query statement at a master machine or a machine delegated to receive query statements sent to the master machine, wherein the query statement is a distributed storage and distributed processing query statement from a client machine that is processed by a distributed storage and distributed processing system;
   evaluate tokens associated with the query statement to selectively identify a pattern match, wherein the tokens are evaluated to selectively identify a pattern match of connection pattern tokens, login pattern tokens and query pattern tokens; and
   form altered tokens for the query statement in response to the pattern match to form a revised query statement, wherein the revised query statement is produced in response to application of a policy rule, wherein the revised query statement maintains computation, logic and procedure of the query statement, but alters parameters of the query statement as specified by the policy rule.

2. The non-transitory computer readable storage medium of claim 1 further comprising instructions executed by the processor to:
   process the statement at the master machine to devise a query plan, wherein the master machine is a segment of the distributed storage and distributed processing system;
   deploy the query plan to a plurality of worker machines of the distributed storage and distributed processing system;
   combine results from the plurality of worker machines to produce a response; and
   supply the response to the client machine.

3. The non-transitory computer readable storage medium of claim 1 wherein the instructions executed by the processor include instructions to alter Uniform Resource Indicator (URI) parameters.

4. The non-transitory computer readable storage medium of claim 1 wherein the instructions executed by the processor include instructions to alter folder or file path parameters.

5. The non-transitory computer readable storage medium of claim 1 wherein the instructions executed by the processor include instructions to alter a query statement.

6. The non-transitory computer readable storage medium of claim 1 wherein the instructions executed by the processor include instructions to alter query source parameters.

7. The non-transitory computer readable storage medium of claim 1 wherein the instructions executed by the processor include instructions to alter login parameters.

8. The non-transitory computer readable storage medium of claim 1 wherein the instructions executed by the processor include instructions to alter data connection parameters.

9. The non-transitory computer readable storage medium of claim 1 wherein the instructions executed by the processor include instructions to add additional parameters in the query statement to water-mark alterations.

\* \* \* \* \*